United States Patent
Almquist et al.

(10) Patent No.: US 12,463,847 B2
(45) Date of Patent: Nov. 4, 2025

(54) CHANNEL ESTIMATION TECHNIQUE

(71) Applicant: Telefonaktiebolaget LM Ericsson (publ), Stockholm (SE)

(72) Inventors: Gustav Almquist, Järfälla (SE); Jung-Fu Cheng, Fremont, CA (US); Stephen Grant, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 18/290,380

(22) PCT Filed: May 13, 2022

(86) PCT No.: PCT/EP2022/063090
§ 371 (c)(1),
(2) Date: Nov. 13, 2023

(87) PCT Pub. No.: WO2022/238574
PCT Pub. Date: Nov. 17, 2022

(65) Prior Publication Data
US 2024/0250850 A1 Jul. 25, 2024

Related U.S. Application Data

(60) Provisional application No. 63/189,008, filed on May 14, 2021.

(51) Int. Cl.
*H04L 25/02* (2006.01)
*H04L 5/00* (2006.01)

(52) U.S. Cl.
CPC ........ *H04L 25/0204* (2013.01); *H04L 5/0007* (2013.01)

(58) Field of Classification Search
CPC ................ H04L 25/0204; H04L 5/0007
See application file for complete search history.

(56) References Cited

U.S. PATENT DOCUMENTS

2004/0202142 A1   10/2004   Batariere et al.
2008/0192846 A1*  8/2008    Bjerke ............... H04L 25/0212
                                                              375/260

FOREIGN PATENT DOCUMENTS

CN            111786916 A      10/2020

OTHER PUBLICATIONS

3GPP, "3rd Generation Partnership Project; Technical Specification Group Radio Access Network; NR; Physical channels and modulation (Release 16)", 3GPP TS 38.211 V16.5.0, Mar. 2021, 1-134.

* cited by examiner

*Primary Examiner* — Rahel Guarino
(74) *Attorney, Agent, or Firm* — Murphy, Bilak & Homiller, PLLC

(57) ABSTRACT

A method of performing channel estimation for a radio channel between a transmitter and a receiver of a radio access network, RAN comprises the step of performing an initial channel estimation (204) of the radio channel for each of a plurality of frequency ranges (502), based on a radio signal received on the radio channel from the transmitter, the radio signal comprising a signal sequence (510) out of the set of signal sequences (510) in each of the frequency ranges (502), to obtain an initial channel estimate (504) for each frequency range (502), and applying a filter (206) to the initial channel estimates (504) for the frequency ranges (502), a length (508) of the filter (206) in the frequency domain being greater than lengths of the frequency ranges (502), to obtain a filtered channel estimate (506) for all subcarriers (406) in the respective one of the frequency ranges (502).

20 Claims, 9 Drawing Sheets

CHANNEL ESTIMATION TECHNIQUE

TECHNICAL FIELD

The present disclosure relates to a technique for performing a channel estimation for a radio channel in a radio access network. More specifically, and without limitation, a method and a device are provided for performing channel estimation for a radio channel between a transmitter and a receiver of a radio access network.

BACKGROUND

"New Radio" (NR) as a radio access technology for Fifth Generation (5G) radio communication between network nodes and radio devices (also referred to as user equipments or UEs) is being designed under coordinated cooperation at the Third Generation Partnership Project (3GPP) to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high-reliability transmission but perhaps for moderate data rates.

One of the solutions for low-latency data transmission is shorter transmission time intervals. In NR in addition to transmission in a slot, a mini-slot transmission is also allowed, to reduce latency. A mini-slot may comprise any number of 1 to 14 Orthogonal Frequency Division Multiplexing (OFDM) symbols. It should be noted that the concepts of slot and mini-slot are not specific to a specific service meaning that a mini-slot may be used for either eMBB, URLLC, or other services.

This flexibility in the time-frequency structure of a radio channel between the network node and the radio device entails flexibly mapping signal sequences to the radio resources of the radio channel, e.g., demodulation reference signals (DM-RS) for channel estimation.

Channel estimation for a physical uplink control channel (PUCCH) in NR is done by using a known DM-RS or base sequences. Conventionally, channel estimates are averaged over time and/or frequency to reduce noise. However, conventional averaging would destroy the orthogonality between the cyclic shifts of the base sequence and/or DM-RS.

Furthermore, it is not obvious how to perform any such averaging in NR, because a dispersive channel should be treated differently from a linear channel.

SUMMARY

Accordingly, there is a need for a robust channel estimation technique that maintains an orthogonal signal structure in the frequency domain.

As to a method aspect, a method of performing channel estimation for a radio channel between a transmitter and a receiver of a radio access network, is provided, where the method may be performed by the transmitter or the receiver, in various embodiments. An example embodiment of the method comprises the step of performing an initial channel estimation of the radio channel for each of a plurality of frequency ranges, based on a radio signal received on the radio channel from the transmitter, the radio signal comprising a signal sequence out of the set of signal sequences in each of the frequency ranges, to obtain an initial channel estimate for each frequency range. The frequency ranges are ranges over which signal sequences out of the set of signal sequences are orthogonal. The method further comprises the step of applying a filter to the initial channel estimates for the frequency ranges, to obtain a filtered channel estimate for all subcarriers in the respective one of the frequency ranges. The length of the filter in the frequency domain is greater than lengths of the frequency ranges.

The method aspect may be implemented alone or in combination with any one of the embodiments in the list of embodiments provided below, particularly the embodiments 1 to 33.

By performing the initial channel estimation over the frequency ranges over which the signal sequences (e.g., cyclic shifts of a base sequence) are orthogonal, resulting in one filtered channel estimate per such frequency region (e.g., by averaging subcarrier initial channel estimates), and then applying a filter over these (e.g., averaged) values per frequency range, the gain of using a filter (e.g., to suppress the noise) is essentially achieved while the signal sequences (e.g., the cyclic shifts) are still orthogonal.

Alternatively or in addition, the method may comprise at least one of the following steps. A first step comprises determining (e.g., identifying) the frequency ranges over which the signal sequences (e.g., the cyclic shifts of the base sequences and/or DM-RS) are orthogonal. A second step comprises performing the initial channel estimation (e.g., including averaging the subcarrier initial channel estimates within each of the determined frequency ranges, resulting in one channel estimate per frequency range). A third step comprises apply a (e.g., appropriate) filter (e.g., of an appropriate length) on the channel estimates for the frequency ranges (e.g., the averaged values). An output of the filter may comprise one filtered (e.g., refined) channel estimate (e.g., one value) per range. The length of the filter may be calculated (e.g., adapted) using the number of subcarriers over which the signal sequences (e.g., the cyclic shifts) are orthogonal, e.g., the number of the subcarriers in each of the determined frequency ranges.

Optionally, the filtered (e.g., refined) channel estimate for each range may be used for transmission and/or reception on the radio channel as an improved channel estimate for all subcarriers within that corresponding range of subcarriers (e.g., the corresponding one of the frequency ranges).

The filter may depend on the use for transmission and/or reception. For example, the filter applied to the initial channel estimates may use a length and/or shape and/or weights that put more weight on the initial channel estimates for frequency ranges comprising a subcarrier considered for the transmission and/or reception, and/or less weight on the initial channel estimates for frequency ranges comprising subcarriers far from a subcarrier considered for the transmission and/or reception. This will improve channel estimation.

Embodiments can maintain the orthogonality, which is broken by conventional filters, between the signal sequences (e.g., the cyclic shifts of the base sequence), since the input to the filter comprises the initial channel estimates per the frequency ranges determined in accordance with the orthogonality of the signal sequences in the set. The orthogonality between the different signal sequences (e.g., different cyclic shifts of the base sequences and/or DM-RS) can be used to convey payload over the radio channel and/or to multiplex multiple users on the radio channel.

The signal sequences (e.g., comprising a cyclically shifted base sequence) may be or may function as a DM-RSs.

Alternatively or in addition, the signal sequences may comprise a cyclically shifted DM-RS.

Any radio device may be a user equipment (UE), e.g., according to a 3GPP specification. The relay radio device may also be referred to as a relay UE (or briefly: relay).

Alternatively or in addition, the remote radio device may also be referred to as a remote UE. Alternatively or in addition, the further radio device may also be referred to as a further UE.

The radio device and the RAN (e.g., the network node) may be wirelessly connected in an uplink (UL) and/or a downlink (DL) through a Uu interface.

The radio device and/or the network may form, or may be part of, a radio access network (RAN), e.g., according to the Third Generation Partnership Project (3GPP) or according to the standard family IEEE 802.11 (Wi-Fi). The method aspect may be performed by one or more embodiments of the radio device and/or the network node (e.g., a base station) of the RAN.

The RAN may comprise one or more base stations, e.g., performing the method aspect. Alternatively or in addition, the radio network may be a vehicular, ad hoc and/or mesh network comprising two or more radio devices, e.g., acting as the remote radio device and/or the relay radio device and/or the further remote radio device.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more network nodes (e.g., base stations).

The radio device may be wirelessly connected or connectable (e.g., according to a radio resource control, RRC, state or active mode) with at least one network node of the RAN.

The network node (e.g., base station) may encompass any station that is configured to provide radio access to any of the radio devices. The base station may also be referred to as cell, transmission and reception point (TRP), radio access node or access point (AP).

The base station and/or the relay radio device may provide a data link to a host computer providing the user data to the remote radio device or gathering user data from the remote radio device.

Examples for the base stations may include a 3G base station or Node B (NB), 4G base station or eNodeB (eNB), a 5G base station or gNodeB (gNB), a Wi-Fi AP, and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

Herein, referring to a protocol of a layer may also refer to the corresponding layer in the protocol stack. Vice versa, referring to a layer of the protocol stack may also refer to the corresponding protocol of the layer. Any protocol may be implemented by a corresponding method.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a device aspect, device according to the embodiments 35 to 46 is provided.

The device may be configured to perform any one of the steps of the first method aspect.

As to a still further aspect a communication system including a host computer is provided. The host computer comprises a processing circuitry configured to provide user data, e.g., included in the first and/or second data of the multi-layer transmission. The host computer further comprises a communication interface configured to forward the first and/or second data to a cellular network (e.g., the RAN and/or the base station) for transmission to a UE. A processing circuitry of the cellular network is configured to execute any one of the steps of the first and/or second method aspects. The UE comprises a radio interface and processing circuitry, which is configured to execute any one of the steps of the first and/or second method aspects.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the network node, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment, to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the techniques described herein may also be implemented for any other radio communication technique, including a Wireless Local Area Network (WLAN) implementation according to the standard family IEEE 802.11, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general-purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
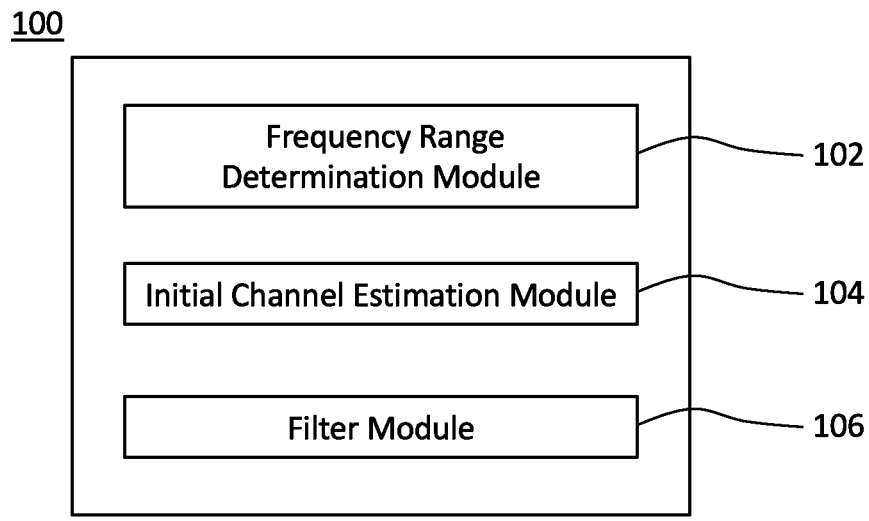
FIG. 1 shows a schematic block diagram of an embodiment of a device for performing channel estimation for a radio channel.

FIG. 1 schematically illustrates a block diagram of an embodiment of a device for performing channel estimation for a radio channel between a transmitter and a receiver in a RAN. The device is generically referred to by reference sign 100.

The device 100 may comprise a frequency range determination module 102 that determines, in a frequency domain of the radio channel, frequency ranges over which signal sequences out of a set of signal sequences are orthogonal.

The device 100 further comprises an initial channel estimation module 104 that performs an initial channel estimation of the radio channel for each of the frequency ranges based on a radio signal received on the radio channel from the transmitter. The radio signal comprises a signal sequence out of the set of signal sequences in each of the frequency ranges. A result of the initial channel estimation comprises, for each of the frequency ranges, an initial channel estimate for the respective one of the frequency ranges.

The device 100 further comprises a filter module 106 that applies a filter on the initial channel estimates for the frequency ranges. A length of the filter in the frequency domain is greater than lengths (e.g., each of the lengths or a common length) of the frequency ranges. A result of the filter comprises, for each of the frequency ranges, a filtered channel estimate for all subcarriers in the respective one of the frequency ranges.

Any of the modules of the device 100 may be implemented by units configured to provide the corresponding functionality.

The device 100 may also be referred to as, or may be embodied by, the receiver (or receiving station). The receiver 100 and the transmitter (or transmitting station) may be in direct radio communication, e.g., at least for performing the initial channel estimation and/or transmitting and/or receiving using the filtered channel estimates.

Figure 2:
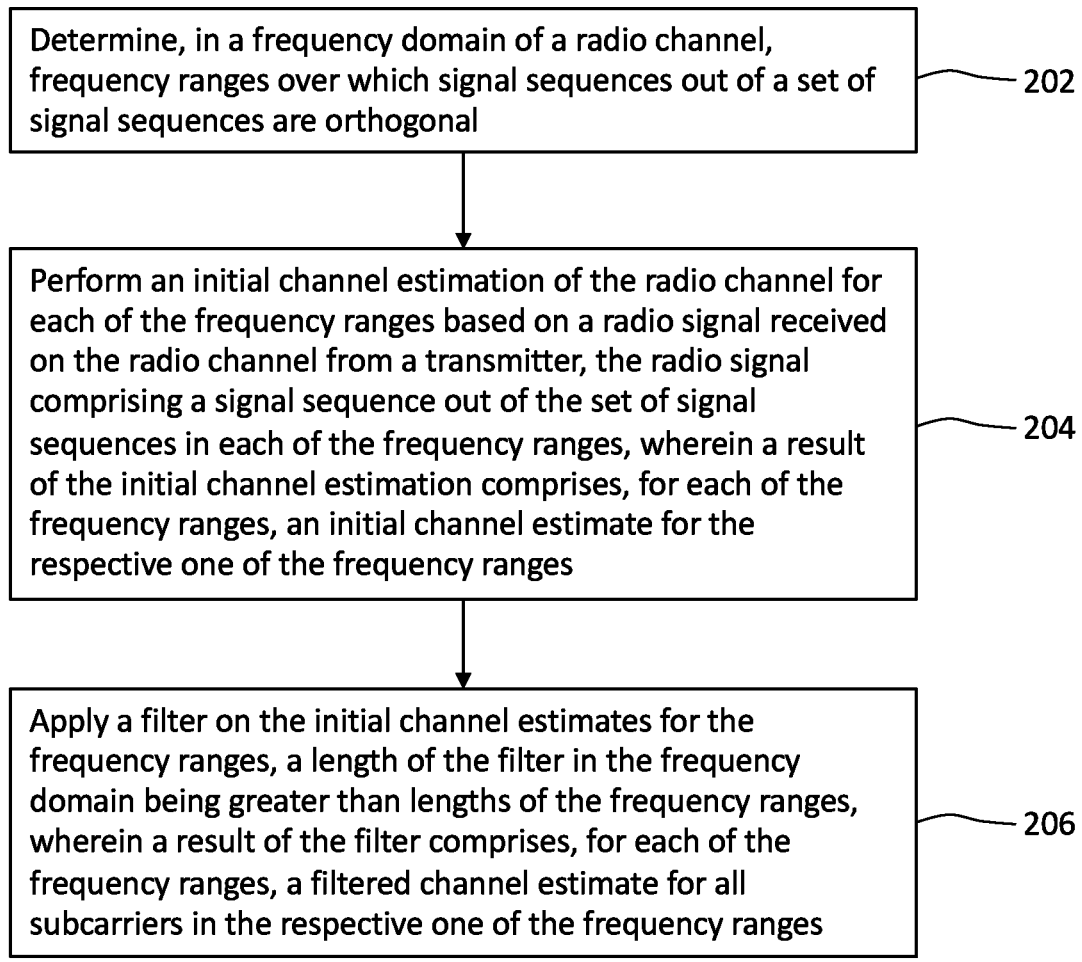
FIG. 2 shows a flowchart for an embodiment of a method of performing channel estimation for a radio channel, which method may be implementable by the device of FIG. 1.

FIG. 2 shows an example flowchart for a method 200 according to the embodiment 1 in the list of embodiments, comprising steps 202, 204, and 206.

The method 200 may be performed by the device 100. For example, the modules 102, 104, and 106 may perform the steps 302, 304, and 306, respectively.

In any aspect, the technique (i.e., the method 200 and/or the device 100) may be applied to uplink (UL) and/or downlink (DL) in the RAN.

Each of the transmitting station and the receiving station 100 may be a radio device or a network node (e.g., base station). Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Herein, whenever referring to noise or a signal-to-noise ratio (SNR), a corresponding step, feature or effect is also disclosed for noise and/or interference or a signal-to-interference-and-noise ratio (SINR).

As an example, the radio channel may be, or may comprise, a physical uplink control channel (PUCCH) for new radio (NR). Alternatively or in addition, the radio channel may be a dispersive channel.

The method 200 may be implemented as an NR PUCCH channel estimation with maintained cyclic shift orthogonality in a (e.g., highly) dispersive channel. Alternatively or in addition, the method may be implemented for a RAN providing radio access according to NR, for a radio channel comprising a PUCCH, for a frequency domain of the radio channel between 52.6 GHz and 71 GHz, for a radio channel comprising a subcarrier spacing (SCS) that is greater than 15 kHz, e.g., equal to 120 kHz, 480 kHz, or 960 kHz.

Clause 6.4.1.3 of the 3GPP document TS 38.211, version 16.5.0, describes a demodulation reference signal (DM-RS) for PUCCH. Various embodiments of the presently disclosed techniques may operate using this reference signal and/or other reference signals or signal sequences described herein.

More specifically, clause 6.4.1.3.1 of the 3GPP document TS 38.211 defines the reference signal sequence for PUCCH format 1 by a product of a Low-PAPR sequence $r_{u,v}^{(\alpha,\delta)}(n)$, e.g. given by clause 5.2.2 of the 3GPP document TS 38.211, and optionally an orthogonal sequence $w_i(m)$, which may be given by Table 6.3.2.4.1.-2 of the 3GPP document TS 38.211 with the same index i as used in clause 6.3.2 of the 3GPP document TS 38.211. The index n may refer to the subcarrier (SC) with the physical resource block (PRB).

Clause 6.4.1.3.3 of the 3GPP document TS 38.211 defines the reference signal sequence for PUCCH formats 3 and 4 by a Low-PAPR sequence $r_{u,v}^{(\alpha,\delta)}(m)$, e.g. given by clause 5.2.3 of the 3GPP document TS 38.211, or given by clause 6.3.2.2 of the 3GPP document TS 38.211 wherein the cyclic shift α varies with the symbol number and slot number according to clause 6.3.2.2.2 of the 3GPP document TS 38.211. The index m may refer to the subcarrier (SC) (e.g., extending over one or more PRBs) within the PUCCH.

The sequence may be a low-PAPR sequence $r_{u,v}^{(\alpha,\delta)}(n)$. Alternatively or in addition, the sequence may be defined according to clause 5.2.2 of the 3GPP document TS 38.211 and/or may be defined by a cyclic shift α of a base sequence $\bar{r}_{u,v}(n)$, e.g. according to $$r_{u,v}^{(\alpha,\delta)}(n) = e^{j\alpha n}\bar{r}_{u,v}(n), 0 \le n < M_{ZC}$$

A linear exponent of a phase factor, e.g., exp(j alpha n) in the above definition of the sequence, may also be referred to as a phase ramp.

The length of the sequence may be $M_{ZC}=mN_{sc}^{RB}/2^\delta$.

Multiple sequences may be defined from a single base sequence through different values of α and δ. The base sequence may be a Zadoff-Chu sequence. The set of sequences may be defined from the single base sequence through different values of α.

The base sequences $\bar{r}_{u,v}(n)$ may be divided into groups, wherein u∈{0, 1, ..., 29} is the group number and v is the base sequence number within the group, such that each group contains one base sequence (v=0) of each length $M_{ZC}=mN_{sc}^{RB}/2^\delta$, ½≤m/2$^\delta$≤5 and two base sequences (v=0,1) of each length $M_{ZC}=mN_{sc}^{RB}/2^\delta$, 6≤m/2$^\delta$. The definition of the base sequence $\bar{r}_{u,v}(0), ..., \bar{r}_{u,v}(M_{ZC}-1)$ may depend on the sequence length $M_{ZC}$.

Figure 3:
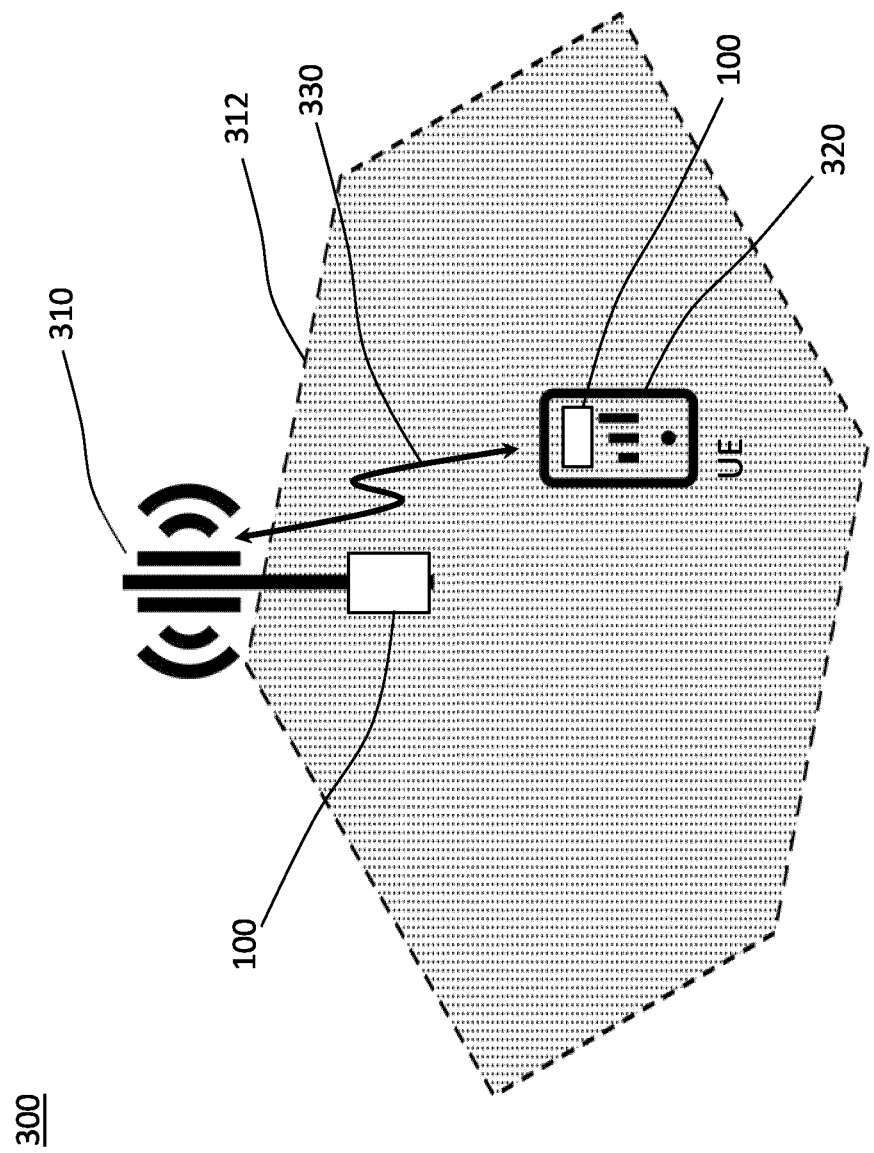
FIG. 3 schematically illustrates an example of a radio access network comprising embodiments of the device of FIG. 1 for performing the method of FIG. 2.

FIG. 3 schematically illustrates an example of the RAN 300 comprising embodiments of the device 100 for performing the method 200. The RAN 300 comprises at least one network node 310 (e.g., a base station, such as a gNB) for providing radio access in a cell 312 to the radio device 320 (e.g., a UE).

The radio device 320 may act as the transmitter and the network node 310 as the receiver embodying the device 100 or performing the method 200, or vice versa, for estimating the radio channel 330 between the radio device 320 and the network node 310.

Figure 4:
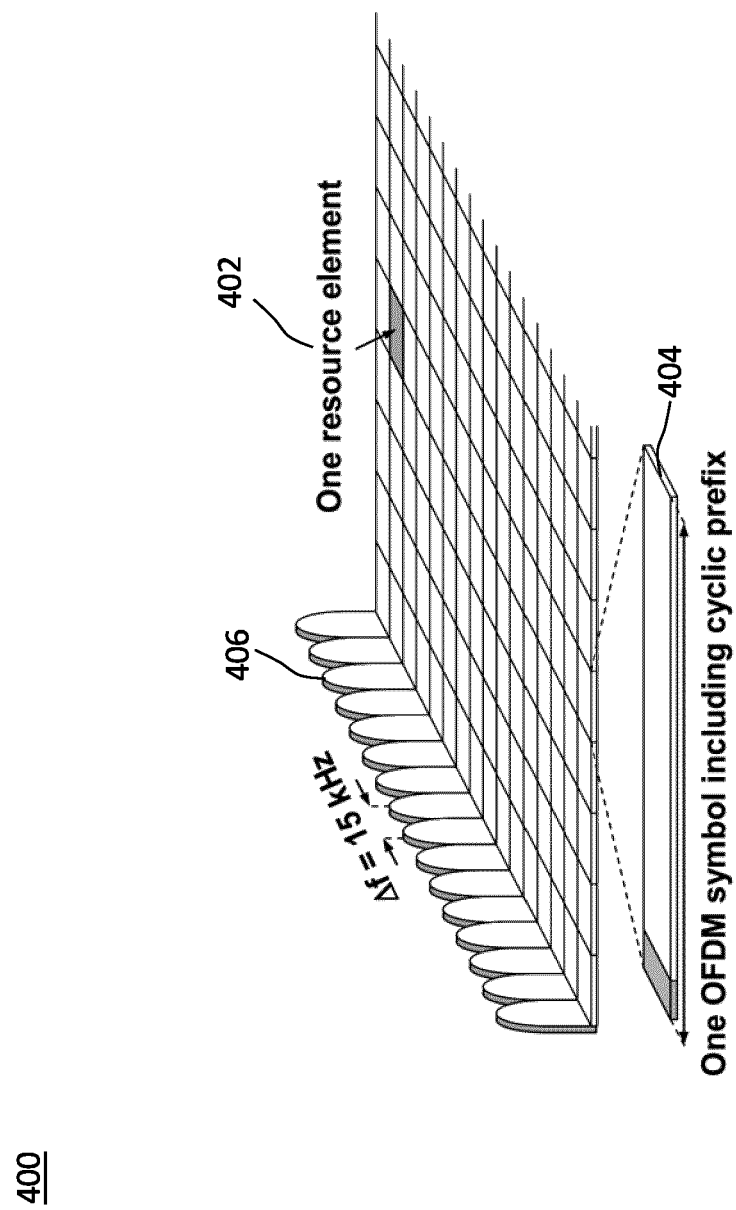
FIG. 4 schematically illustrates an example of a time-frequency structure of a radio channel that may be used by the device of FIG. 1 performing the method of FIG. 2.

FIG. 4 schematically illustrates an example of a time-frequency structure 400 of the radio channel 330. The radio channel 330 comprises exemplary radio resource of NR, such as a resource element (RE) 402. The RE 402 is within on OFDM symbol 404 in the time domain. Furthermore, the RE 402 is within one subcarrier (SC) 406 in the frequency domain.

The radio resources may be organized into groups of REs 402, these groups being referred to as Resource Blocks (RBs). In Release 15 of NR, a UE can be configured with up to four carrier bandwidth parts in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWB}^{size}-1$, where i is the index of the carrier bandwidth part. A resource block (RB) is defined as 12 consecutive subcarriers in the frequency domain.

Multiple OFDM numerologies, labeled by the integer μ, are supported in NR, as given by Table 1. The subcarrier spacing, Δf, and the cyclic prefix for a carrier bandwidth part may be configured, for a given UE, by different higher layer parameters for downlink and uplink, respectively.

TABLE 1

Supported transmission numerologies.

| μ | Δf = $2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

The radio channel 330 may comprise at least one of the following physical channels.

A downlink physical channel corresponds to a set of resource elements carrying information originating from higher layers. The following downlink physical channels are defined: Physical Downlink Shared Channel (PDSCH), Physical Broadcast Channel (PBCH), and Physical Downlink Control Channel (PDCCH).

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined: Physical Uplink Shared Channel (PUSCH), Physical Uplink Control Channel (PUCCH), and Physical Random Access Channel (PRACH).

PUSCH is the uplink counterpart to the PDSCH. PUCCH is used by UEs to transmit uplink control information, including HARQ acknowledgements, channel state information reports, etc. PRACH is used for random access preamble transmission.

The network node may allocate frequency resource for PUSCH and PDSCH, e.g., in units of RBs.

In general, a UE shall determine the RB assignment in frequency domain for PUSCH or PDSCH using the resource allocation field in the detected DCI carried in PDCCH. For PUSCH carrying the third message (msg3) of in a random access procedure, the frequency domain resource assignment is signaled by using the UL grant contained in RAR.

In NR, two frequency resource allocation schemes, type 0 and type 1, are supported for PUSCH and PDSCH. Which type to use for a PUSCH/PDSCH transmission is either defined by an RRC configured parameter or indicated directly in the corresponding DCI or UL grant in RAR (for which type 1 is used).

The RB indexing for uplink/downlink type 0 and type 1 resource allocation is determined within the UE's active carrier bandwidth part, and the UE shall upon detection of PDCCH intended for the UE determine first the uplink/downlink carrier bandwidth part and then the resource allocation within the carrier bandwidth part. The UL BWP for PUSCH carrying the msg3 of a random access procedure is configured by higher layer parameters.

The radio channel 330 may be used for cell search and/or initial access related channels and signals.

For cell search and initial access, the radio channel 330 may include at least one of synchronization signals (SSs) and/or a physical broadcast channel (PBCH), which may be collectively referred to by SS/PBCH block; a PDSCH carrying system information block 1 (SIB1) that is also referred to as Remaining Minimum SI (RMSI) and/or a random access response (RAR) and/or a fourth message (msg4) of the random access procedure, each of which may be scheduled by PDCCH channels carrying DCI; PRACH channels; and PUSCH channel carrying msg3.

Synchronization signal and PBCH block (SS/PBCH block, or SSB in shorter format) comprises the above signals (PSS, SSS and PBCH DM-RS), and PBCH. SSB may have a subcarrier spacing (SCS) of 15 kHz, 30 kHz, 120 kHz or 240 kHz depending on the frequency range.

Furthermore, the radio channel (e.g., for NR) may comprise radio bands between 52.6 GHz and 71 GHz. Support for NR in the radio bands between 52.6 GHz and 71 GHz may, e.g., use higher subcarrier spacings, for example 480 kHz and 960 kHz.

Figure 5:
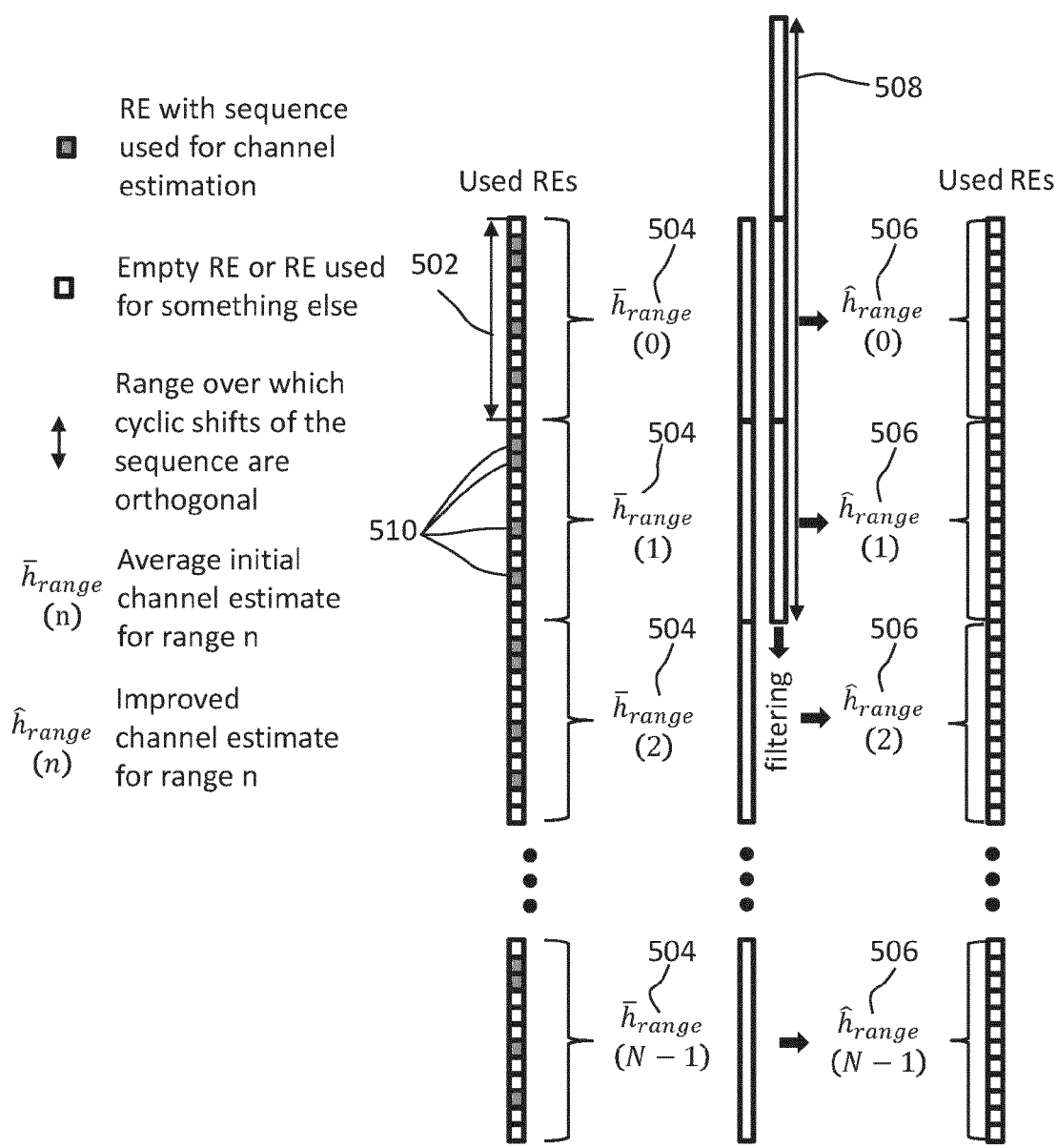
FIG. 5 schematically illustrates a exemplary implementations of steps of the method of FIG. 2 in a frequency domain of the radio channel.

FIG. 5 schematically illustrates steps and corresponding results of an embodiment of the method 200. The frequency domain is schematically illustrated in the vertical direction (i.e., up-down direction) of FIG. 5. Squares represent RE 402. Furthermore, the sequence of steps and corresponding results is shown in the vertical direction (i.e., from left to right).

Hereinbelow, for concreteness and not limitation of the description, the radio channel 330 (or briefly: channel) is a PUCCH. Moreover, the cyclic shifts of a base sequence serve as an example for the set of signal sequences 510.

Channel estimation for PUCCH 330 in NR is done by using the known (e.g., predefined or configured or hard-coded) demodulation reference symbols (DM-RS) or base sequences 510.

In an embodiment, initial channel estimates for each subcarrier are calculated in the step 204. The noise in the initial channel estimates may be reduced by frequency domain averaging over one or more complete periods of the phase ramp, since conventional filtering would destroy the orthogonality between the cyclic shifts of the base sequence and/or DM-RS 510. Therefore, the channel estimates are typically averaged per physical resource block (PRB) or over all PRBs.

If the channel varies significantly between PRBs, averaging within a single PRB is suitable, otherwise averaging across all PRBs may be suitable. Typically, the channel variation (i.e., the variation of the channel estimate, such as channel coefficients, as a function of frequency or in terms of subcarriers) is large for large subcarrier spacings (SCSs) and/or large delay spreads of the radio channel 330, and the variation is small for low SCSs and/or low delay spreads. While this strategy works well for low channel variation with averaging over all PRBs and for high channel variation with averaging within each PRB, respectively, embodiments of the technique can further improve the channel estimate (and thus the SNR), e.g., in between low and high channel variation, by changing the lengths 508 of the filter 206 (e.g., the length for averaging over a subset of PRBs).

According to an embodiment of the technique, orthogonality between cyclic shifts is maintained and still much of the gain from filtering is achieved by performing channel estimate filtering or averaging at two different levels according to the steps 204 and 206, respectively.

The first level of averaging or filtering of the subcarrier initial channel estimates is performed over the frequency range 502 over which the cyclic shifts remain orthogonal. One value for the initial channel estimate 504 is obtained by the averaging or filtering per frequency range 502 in the step 204 for each of the frequency ranges 502 determined in the step 202. Alternatively, the initial channel estimate 504 per frequency range 502 is directly derived from the radio signal received from the transmitter, e.g., by computing a scalar product in the respective frequency range 502 between the received radio signal and the signal sequence out of the set. The scalar product may be computed (e.g., as a correlation) in time domain (using samples) or in the frequency domain (using Fourier components). The step 204 or this first level processing maintains the orthogonality.

As one nonlimiting exemplary embodiment, the first level of averaging or filtering of the subcarrier initial channel estimates is an equal-weight average of raw channel estimates (e.g., computed per subcarrier).

A second level of averaging or filtering is then applied over the initial channel estimates 504 per frequency range 502 (i.e., the frequency range-averaged or frequency range-filtered channel estimates) according to the step 206. The filter 206 may put more weight on averages calculated from ranges that are close and less weight on the initial channel estimates (e.g., averages) calculated from frequency ranges that are further away. The output from the filter 206 is or comprises one improved channel estimate (i.e., the filtered channel estimate 506) per frequency range 502 over which the cyclic shifts are orthogonal. The improved channel estimate for a frequency range 502 is then used as channel estimate for all subcarriers within that range.

As one nonlimiting exemplary embodiment, the filter 206, i.e., the second level of averaging or filtering of the initial channel estimates 504 (e.g., the previously frequency range-averaged and/or frequency range-filtered channel estimates 504) is a symmetric triangular filter. More specifically, given an odd filter length L 508 in terms of frequency ranges 502, the symmetric triangular filter 206 is defined by $$f(k) = \frac{1}{L + \left\lfloor \frac{L}{2} \right\rfloor^2} \left( \left\lceil \frac{L}{2} \right\rceil - |k| \right), k = -\left\lfloor \frac{L}{2} \right\rfloor, \ldots, \left\lfloor \frac{L}{2} \right\rfloor$$

wherein $\lceil \cdot \rceil$ is the ceil operator, $\lfloor \cdot \rfloor$ is the floor operator and $|\cdot|$ is the absolute value operator.

In NR PUCCH the base sequences and DM-RS typically have 12 orthogonal cyclic shifts which means that the range over which the cyclic shifts are orthogonal is 12 consecutive elements of the used sequence. In NR the 12 elements are typically mapped over 12 consecutive REs within a PRB which means that the range over which the cyclic shifts are orthogonal is a PRB. For this example, the average initial channel estimate would be calculated for each PRB. It is however possible to define more or less cyclic shifts 510 than 12 and also possible to map these sequences 510 in a non-consecutive manner over the REs 402 of the frequency range 502 such that the frequency range 502 over which the cyclic shifts are orthogonal spans more or less than 12 REs 402. In that case the frequency range 502, over which to average the subcarrier initial channel estimates computed for deriving the initial channel estimate 504 or the frequency range 502 of the scalar product for directly deriving the initial channel estimate 504, spans the length of the number of sequence elements required to get orthogonal cyclic shifts 510.

Note that the average of the subcarrier initial channel estimates or the scalar product is only calculated using the mapped elements of the signal sequence (e.g., cyclic shift of the base sequence or DM-RS, or any other predefined sequence suitable for channel estimation). Any empty REs 402 or REs 402 used for something else is not included in the average of the scalar product.

The frequency ranges 502 preferably together span all used REs 404, also the ones not used for channel estimation.

The improved channel estimate, i.e., the channel estimate per frequency range 502 resulting from the step 206 (i.e., after filtering for a frequency range) is mapped or applied to all REs 402 within the respective frequency range 502, so that there is a channel estimate for all (e.g., used) REs 402.

In one non-limiting example, a suitable span, $L_{span}$, of the combined two-level filtering/averaging operation or of the length 508 of the filter 206, is calculated using the subcarrier spacing, S, and coherence bandwidth B≈1/D, wherein D is the root-mean-squared (RMS) delay spread.

$$L_{span} = \left\lfloor \frac{\alpha B}{S} \right\rfloor$$

wherein $\alpha$ is a scaling factor and $\lfloor \cdot \rfloor$ is the floor operator.

Since the first level averaged/filtered initial channel estimates each correspond to a range of REs, the length of the second level filter used to filter these averages must be compensated for the bandwidth spanned by each frequency range 502, for example the filter length 508 could be $L_{span}/RE_{range}$, wherein $RE_{range}$ is the REs spanned by each range. Typically, this will not be an integer so some sort of rounding, floor, ceil or closest, may be applied.

Since most weight in the second level filtering should be put on the current average or the frequency range 502 currently used for transmission or reception on the radio channel 330, it is suitable to use a symmetrical filter 206 of odd length 508, with a peak at lag zero (e.g., k=0), for example a bell-shaped filter or a triangular filter.

To get an odd length, the length of the used filter can be calculated as the closest odd value of $L_{span}/RE_{range}$, e.g., according to $$L = 2 \left\lfloor \left( \frac{L_{span}}{RE_{range}} \right) / 2 \right\rfloor + 1$$

wherein $\lfloor \cdot \rfloor$ is the floor operator.

If $L_{span}/RE_{range}$ is an even integer, the length L 508 may be rounded up to the closest odd integer.

In an embodiment, the filtering operation, i.e., the filter 206, may be expressed in the following form or computed in accordance with $$\hat{h}_{range} = \frac{1}{G(n)} \sum_{k=-L_e}^{L_s} g(k) \bar{h}_{range}(n-k), n = 0, 1 \ldots, N-1$$

wherein $\bar{h}_{range}(n)$ are the averages for each range n=0, ..., N−1, g(k), k=−$L_e$, ..., $L_s$ is an appropriate filter, L=$L_e$+$L_s$+1 is the filter length and G(n) is a suitable filter normalization. For example, G(n) could be the sum of all taps in g(k) that are multiplied with a nonzero value of $\bar{h}_{range}(n)$. $\bar{h}_{range}$ should be zero-padded so that the filter 206 can be applied to all frequency ranges 502.

$\hat{h}_{range}(n)$ is used as the filtered (i.e., improved) channel estimate 506 for all REs 402 and/or all subcarriers 406 in the frequency range n (at reference sign 502).

An embodiment of the method 200 has been evaluated by means of numerical simulation. The length 508 of the filter 206 is calculated using α=0.2 and the filter is a symmetrical triangular filter with $L_e$=$L_s$ defined according to $$g(k) = \left\lceil \frac{L}{2} \right\rceil - |k|, k = -\left\lfloor \frac{L}{2} \right\rfloor, \ldots, \left\lfloor \frac{L}{2} \right\rfloor$$

wherein $\lceil \cdot \rceil$ is the ceil operator, $\lfloor \cdot \rfloor$ is the floor operator and $|\cdot|$ is the absolute value operator.

Figure 6:
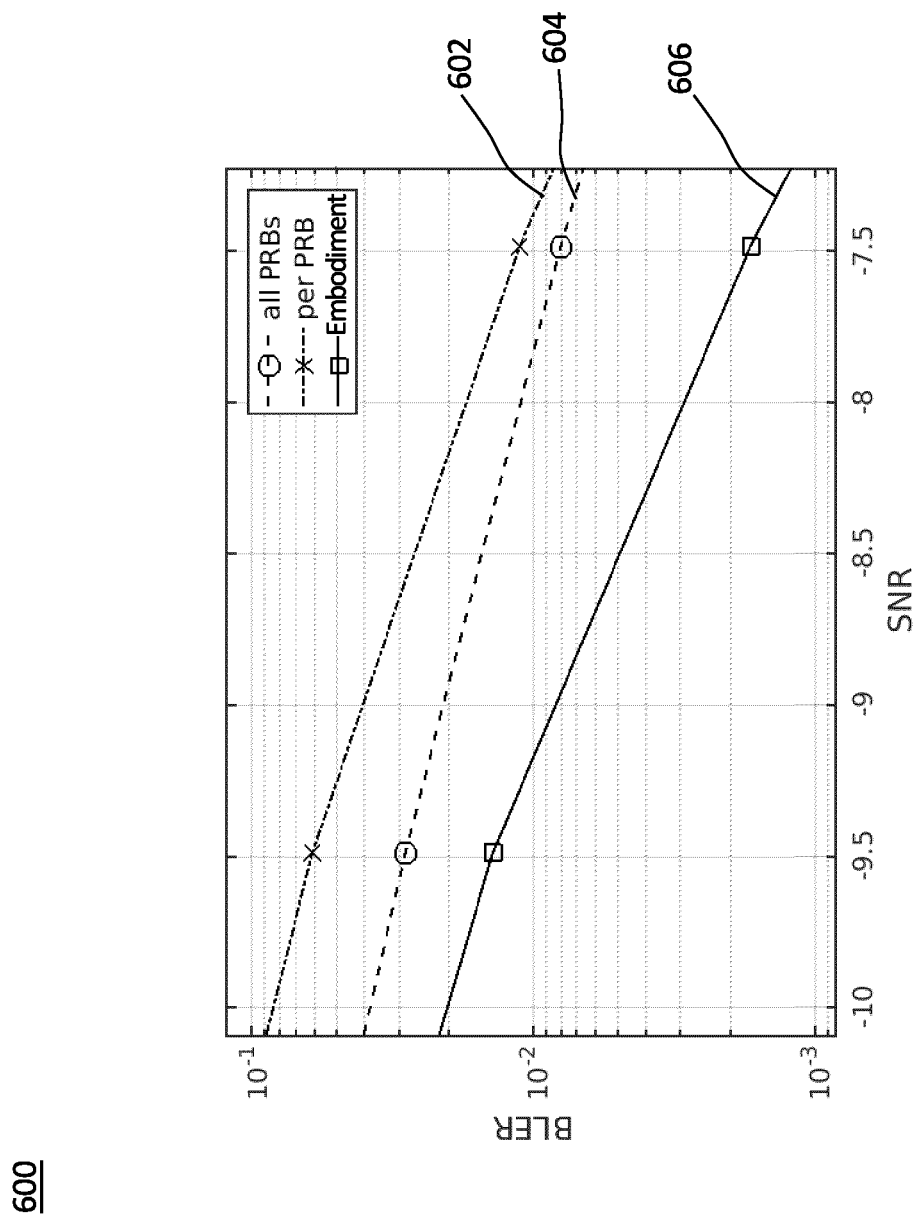
FIG. 6 shows a diagram comprising exemplary block error rates of reference examples and an embodiment of the method of FIG. 2.

FIG. 6 shows simulation results for NR PUCCH format 4 with 11 bits payload, 4 OFDM symbols using frequency hopping. The format is extended using 12 consecutive PRBs with 120 kHz subcarrier spacing for a channel model Tapped Delay Line (TDL-A) with 3 km/h 20 ns delay spread. The performance is for 1 user for an orthogonal cover code (OCC) level 2 which means that two users can be multiplexed using OCCs on data and cyclic shifts on DM-RS. The operating point is 1% block error rate (BLER). As can be seen in the FIG. 6, the embodiment performs 1.4 dB better than averaging per PRB and 1.8 dB better than averaging over all PRBs.

Alternatively or in addition, the method 200 may comprise exclusively or additionally, the features and steps of any one of the following exemplary embodiment, which may be combinable with any feature or step disclosed herein, e.g., with any embodiment in the list of embodiments.

A first exemplary embodiment comprise a method 200 to improve channel estimation while maintaining orthogonality between cyclic shifts of the used sequences. Subcarrier initial channel estimates are averaged over a frequency range 502 over which orthogonality between cyclic shifts is maintained in the step 204. The averaged subcarrier initial channel estimates 504 are filtered in the step 206. The resulting filtered (e.g., improved) channel estimates 506 are used as channel estimates for all resource elements (RE) 402 within the respective one of the frequency ranges 502.

In a non-limiting example of this embodiment, the filter provides larger weighting from nearby frequency ranges 502 and smaller weighting from frequency ranges 502 farther away from the desired range.

A second exemplary embodiment comprises the method of the first exemplary embodiment, wherein the length 508 of the used filter 206 is calculated as a ratio between the filter span (e.g., the number of REs 402 over which to apply the filter 206) and the number of REs 402 spanned by each frequency range 502 over which the cyclic shifts are orthogonal.

In a non-limiting example of the second embodiment, the filter span is chosen to achieve a balance between canceling noise and weighting in channel estimates that vary much because of the dispersion of the channel. For example, the filter span can be calculated using the coherence bandwidth (e.g., estimated from the RMS delay spread) and the subcarrier spacing.

A third exemplary embodiment comprises the method of the first or second exemplary embodiment, wherein the length 508 of the used filter 206 is calculated as the closest odd value to a ratio between the filter span and the number of REs in a frequency range over which orthogonality between the cyclic shifts is maintained. If the ratio is even, then the value can either be rounded up or down to the closest odd value.

A fourth exemplary embodiment comprises the method of the first, second or third exemplary embodiment, applied to NR PUCCH formats 0, 1 and 4 or an extensions of NR PUCCH formats 0, 1 and 4.

A fifth exemplary embodiment comprises the method of any one of the first to fourth exemplary embodiment, in which the signal sequence 510 used for channel estimation, inside a frequency range 502 over which orthogonality between cyclic shifts is maintained, is mapped to contiguous REs 402.

A sixth exemplary embodiment comprises the method of any one of the first to fifth exemplary embodiment, in which the signal sequence 510 used for channel estimation, inside a frequency range 502 over which orthogonality between cyclic shifts is maintained, is mapped to non-contiguous REs 402.

A seventh exemplary embodiment comprises the method of either of the fifth or sixth embodiment, in which the frequency range 502 comprises an integer number of PRBs greater than or equal to 1.

Figure 7:
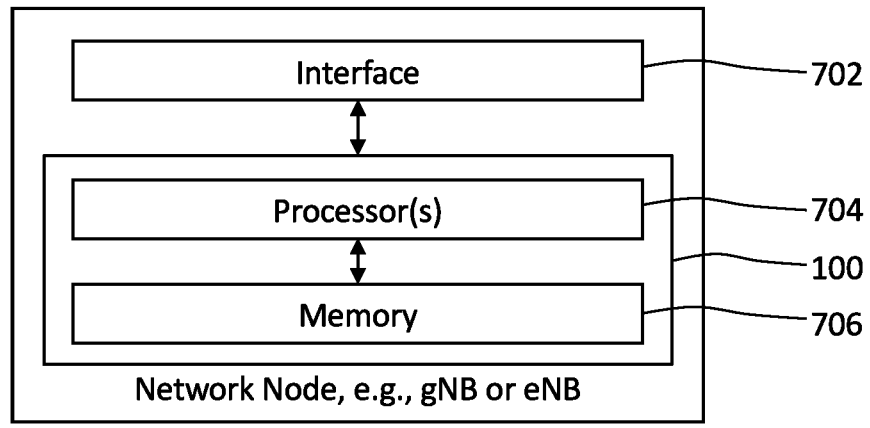
FIG. 7 shows a schematic block diagram of a network node embodying the device of FIG. 1.

FIG. 7 shows a schematic block diagram for an embodiment of the device 100. The device 100 comprises processing circuitry, e.g., one or more processors 704 for performing the method 300 and memory 706 coupled to the processors 704. For example, the memory 706 may be encoded with instructions that implement at least one of the modules 102, 104 and 106.

The one or more processors 704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 706, receiver functionality. For example, the one or more processors 704 may execute instructions stored in the memory 706. Such functionality may include providing various features and steps discussed herein, including any of the benefits disclosed herein. The expression "the device being operative to perform an action" may denote the device 100 being configured to perform the action.

As schematically illustrated in FIG. 7, the device 100 may be embodied by a network node 700, e.g., functioning as a receiving base station. The network node 700 comprises a radio interface 702 coupled to the device 100 for radio communication with one or more radio devices, e.g., functioning as a transmitting UE.

Figure 8:
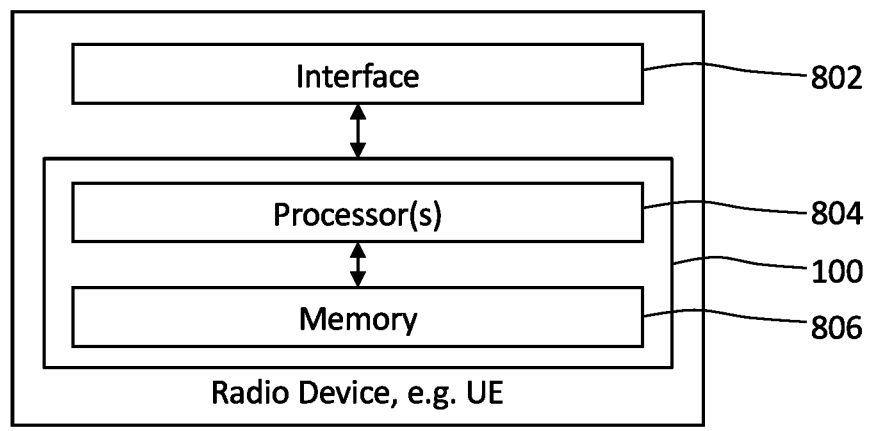
FIG. 8 shows a schematic block diagram of a radio device embodying the device of FIG. 1.

FIG. 8 shows a schematic block diagram for an embodiment of the device 100. The device 100 comprises processing circuitry, e.g., one or more processors 804 for performing the method 400 and memory 806 coupled to the processors 804. For example, the memory 806 may be encoded with instructions that implement at least one of the modules 102, 104 and 106.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 806, receiver functionality. For example, the one or more processors 804 may execute instructions stored in the memory 806. Such functionality may include providing various features and steps discussed herein, including any of the benefits disclosed herein. The expression "the device being operative to perform an action" may denote the device 200 being configured to perform the action.

As schematically illustrated in FIG. 8, the device 200 may be embodied by a radio device 800, e.g., functioning as a receiving UE. The radio device 800 comprises a radio interface 802 coupled to the device 100 for radio communication with one or more transmitter, e.g., functioning as a transmitting network node.

Figure 9:
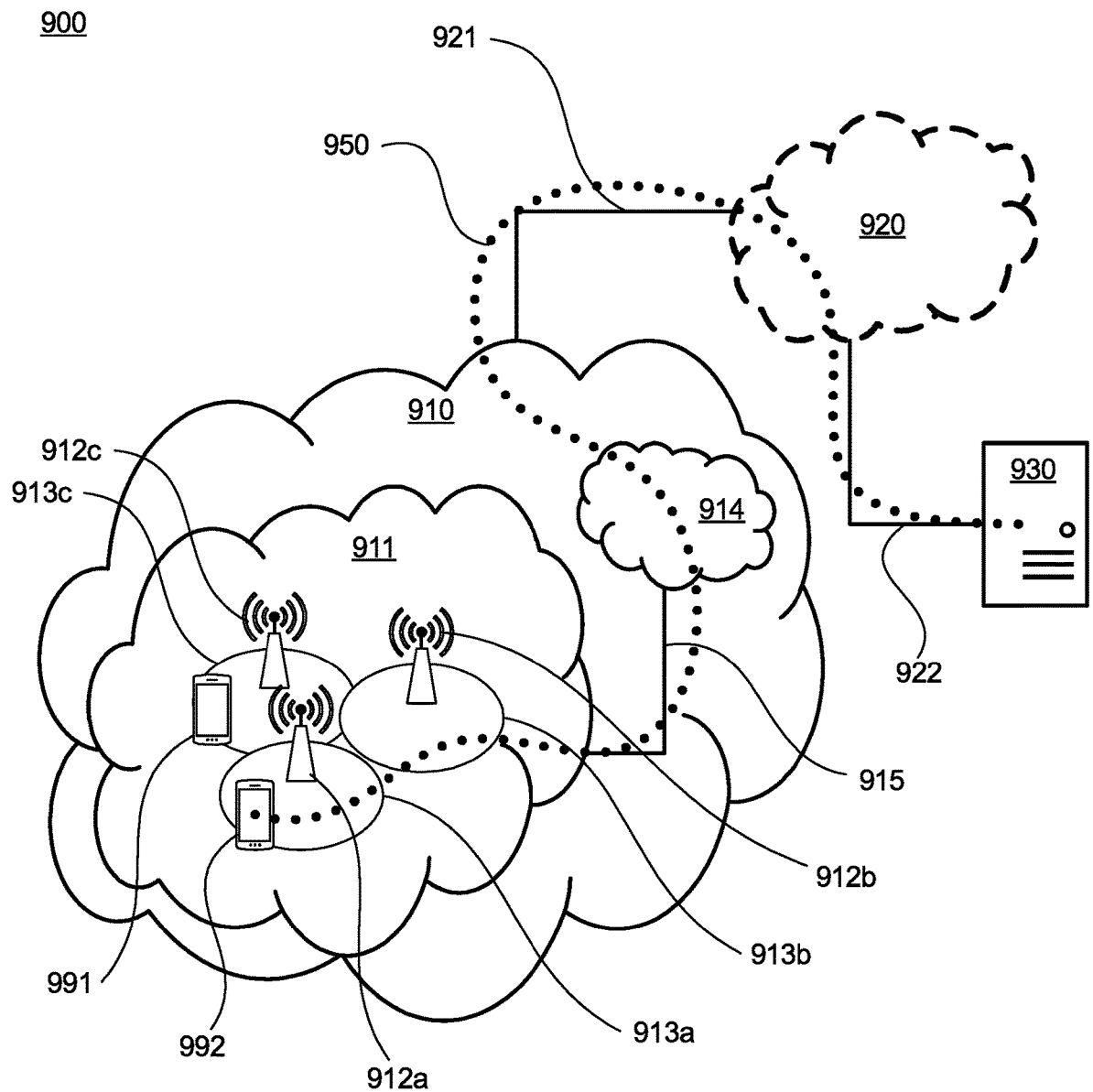
FIG. 9 schematically illustrates an example telecommunication network connected via an intermediate network to a host computer.

With reference to FIG. 9, in accordance with an embodiment, a communication system 900 includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Any of the base stations 912 and the UEs 991, 992 may embody the device 100.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system 900 of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

By virtue of the method 100 being performed by any one of the UEs 991 or 992 and/or any one of the network nodes (e.g., base stations 912), the performance or range of the OTT connection 950 can be improved, e.g., in terms of increased throughput and/or reduced latency. More specifically, the host computer 930 may indicate to the RAN 300 or the radio device 320 or the network node 310 (e.g., on an application layer) a trigger for performing the method 200, e.g., a QoS of the traffic.

Example implementations, in accordance with an embodiment of the UE, base station and host computer discussed in the preceding paragraphs, will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data, which is transmitted using the OTT connection 1050. The user data may depend on the location of the UE 1030. The user data may comprise auxiliary information or precision advertisements (also: ads) delivered to the UE 1030. The location may be reported by the UE 1030 to the host computer, e.g., using the OTT connection 1050, and/or by the base station 1020, e.g., using a connection 1060.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct, or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
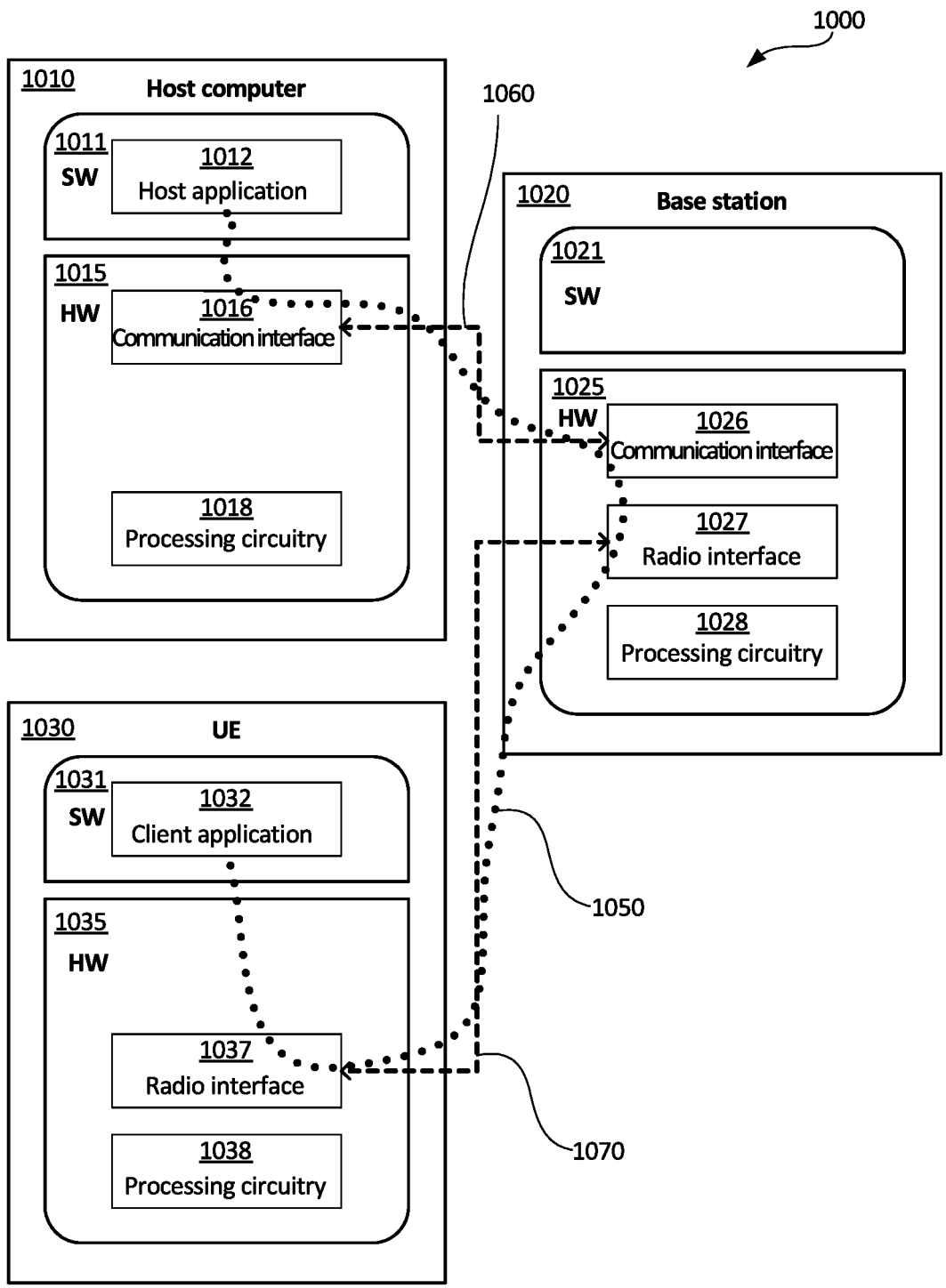
FIG. 10 shows a generalized block diagram of a host computer communicating via a base station or radio device functioning as a gateway with a user equipment over a partially wireless connection.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10, and, independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or "dummy" messages, using the OTT connection 1050 while it monitors propagation times, errors etc.

Figures 11, 12:
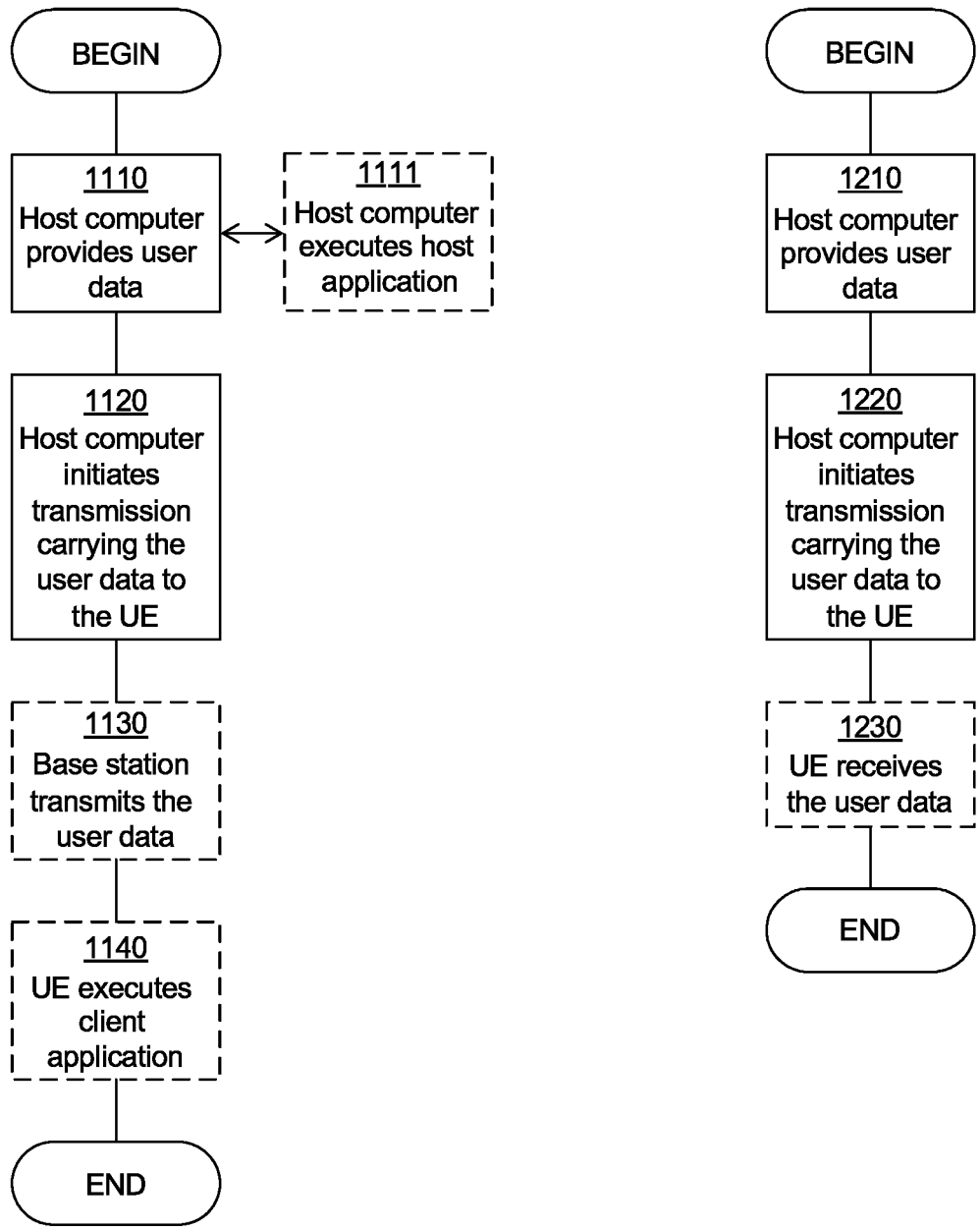
FIGS. 11 and 12 show flowcharts for methods implemented in a communication system including a host computer, a base station or radio device functioning as a gateway and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this paragraph. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this paragraph. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

As has become apparent from above description, at least some embodiments of the technique improve channel estimation with maintained orthogonality between signal sequences, for example cyclic shifts of one or more base sequences and/or DM-RS. Thus, the cyclic shift orthogonality can be used for many types of signals, including conveying payload and/or multiplexing multiple users on the radio channel.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following embodiments.

EXAMPLE EMBODIMENTS

Examples of embodiments of the techniques, apparatuses, and systems described above include, but are not limited to, the following enumerated examples.

1. A method (200) of performing channel estimation for a radio channel (330) between a transmitter and a receiver (100) of a radio access network, RAN (300), the method (200) performed by the receiver (100) comprising or initiating the steps of:

determining (202), in a frequency domain of the radio channel (330), frequency ranges (502) over which signal sequences (510) out of a set of signal sequences (510) are orthogonal;

performing an initial channel estimation (204) of the radio channel (330) for each of the frequency ranges (502) based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and applying a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

Applying the filter may comprise filtering the initial channel estimates on the level of the frequency ranges using the filter in the frequency domain.

The length of the filter being greater than lengths of the frequency ranges may mean that the filtered channel estimate for one of the frequency ranges also depends on one or more initial channel estimates for frequency ranges other than (e.g., outside of) the one of the frequency ranges.

The initial channel estimation may also be referred to as coarse channel estimation. The initial channel estimates may also be referred to as coarse channel estimates. Alternatively or in addition, a functional unit of the receiver performing the initial channel estimation may also be referred to as the initial channel estimation. Alternatively or in addition, the expressions performing the initial channel estimation and the initial channel estimation may be used synonymously.

The initial channel estimation may result in (e.g., output) one initial channel estimate per frequency range, i.e., one initial channel estimate for each of the frequency ranges. The result of the initial channel estimation may comprise, for each of the frequency ranges, an initial channel estimate for all subcarriers in the respective one of the frequency ranges.

The filtered channel estimates may also be referred to as refined channel estimates. Applying the filter may also be referred to as filtering. Alternatively or in addition, a functional unit of the receiver applying the filter may also be referred to as the filter. Alternatively or in addition, the expressions filter and filtering may be used synonymously.

The same filtered channel estimate may apply for all subcarriers in the respective one of the frequency ranges. The filter may result in (e.g., output) one filtered channel estimate per frequency range, i.e., one filtered channel estimate for each of the frequency ranges.

The set of signal sequences may be mutually orthogonal, i.e., all signal sequences in the set may be pair-wisely orthogonal. Optionally, different frequency ranges may be associated with different sets of the orthogonal signal sequences. Alternatively or in addition, the signal sequences in the set may be (e.g., predefined) demodulation reference signals (DM-RSs).

The frequency ranges may be determined based on a technical standard. Alternatively or in addition, the frequency ranges may be determined by computing a cross-correlation between the radio signal received on the radio channel from the transmitter and the set of signals. A frequency range of the frequency ranges may be determined, if the cross-correlation is zero or essentially zero. Alternatively or in addition, the frequency ranges may be determined by computing a (e.g., temporal) auto-correlation of the radio signal received on the radio channel from the transmitter. A frequency range of the frequency ranges may be determined, if the auto-correlation for a non-zero shift is zero or essentially zero.

The frequency ranges may be determined in terms of subcarriers or physical resource blocks (PRBs).

The length of the filter in the frequency domain may be greater than the length of each of the frequency ranges. Optionally, the lengths of all of the frequency ranges may be equal.

The length of the filter in the frequency domain may correspond to a support of the filter or a full width at half maximum (FWHM, e.g., in terms of weight per frequency range used by the filter) or 68% or 75% of integrated weight of the filter.

2. The method (200) of embodiment 1, wherein performing the initial channel estimation (204) comprises:
   computing a subcarrier initial channel estimate for each subcarrier (406) within each of the frequency ranges (502); and
   averaging the subcarrier initial channel estimates within each of the frequency ranges (502), resulting in the initial channel estimate (504) for each of the frequency ranges (502).

Computing the subcarrier initial channel estimate for each subcarrier within each of the frequency ranges may comprise multiplying the received radio signal in the respective frequency range with a Fourier component of the signal sequence in the respective subcarrier (or a complex conjugate of the Fourier component of the signal sequence in the respective subcarrier). The multiplying may use a scalar product, e.g., for the respective frequency range.

The averaging of the initial channel estimates within each of the frequency ranges may be a linear and/or equally weighted average of the subcarrier initial channel estimates within each of the frequency ranges.

3. The method (200) of embodiment 1 or 2, wherein the length (508) of the filter in the frequency domain is an integer multiple of the lengths of the frequency ranges (502), and/or wherein the length (508) of the filter encompasses a contiguous subset of the frequency ranges (502).

The length of the filter may encompass two neighboring frequency ranges or three or more contiguous frequency ranges. For example, the length of the filter may encompass a center frequency range and the (e.g., one or two) neighboring frequency ranges of the center frequency range.

4. The method (200) of any one of embodiments 1 to 3, wherein performing the initial channel estimation comprises computing the initial channel estimate (504) for each of the frequency ranges (502) based on the orthogonality of the signal sequences (510).

Performing the initial channel estimation may comprise determining the initial channel estimate for each of the frequency ranges by multiplying the received radio signal in the respective frequency range with the signal sequence or a complex conjugate of the signal sequence. The multiplying may use a scalar product, e.g., for the respective frequency range.

5. The method (200) of any one of embodiments 1 to 4, wherein the set of signal sequences (510) comprises cyclic shifts of a base sequence or a demodulation reference signal, DM-RS.

The cyclic shifts may correspond to cyclic temporal shifts (e.g., within the duration of one symbol). Alternatively or in addition, each of the cyclic shifts may correspond to a phase (e.g., a phase difference between differently shifted signals) that is a linear function of frequency (e.g., proportional to a subcarrier index). The linear phase may also be referred to as phase ramp. Each of the determined frequency ranges may correspond to a full phase ramp (i.e., the phase changes by $2\cdot\pi$).

The frequency range (e.g., over which to average the subcarrier initial channel estimates) may correspond to the subcarriers to which the signal sequence is mapped to get orthogonal cyclic shifts.

6. The method (200) of embodiment 5, wherein the base sequence comprises a Zadoff-Chu sequence.

7. The method (200) of any one of embodiments 1 to 6, wherein the signal sequences (510) are orthogonal, if a cross-correlation between samples of the signal sequences (510) is zero or essentially zero.

The cross-correlation may be essentially zero, if a value of the cross-correlation is small compared to a maximum of the auto-correlation or quadratic norm of each of the signal sequences.

The length of the determined frequency ranges may be the common length of each of the determined frequency ranges.

8. The method (200) of embodiment 7, wherein a sampling rate of the samples of the signal sequences (510) is, or is proportional to, the inverse of the length (508) of the determined frequency ranges (502).

9. The method (200) of any one of embodiments 1 to 8, wherein the length (508) of the filter (206) is determined by a ratio between a filter span over which the filter 206 is applied in the frequency domain and a number of a length of the determined frequency ranges (502).

10. The method (200) of embodiment 9, wherein the filter span and the length of the determined frequency ranges in the ratio are determined in numbers of resource elements, REs (402).

11. The method (200) of embodiment 9 or 10, wherein the length (508) of the filter (206) is the closest odd value to the ratio.

12. The method (200) of any one of embodiments 1 to 11, wherein the length (508) of the filter in the frequency domain depends on a variation of the channel estimates in the frequency domain or a dispersion of the radio channel (330).

The radio channel may be a dispersive channel. A phase velocity (c) of the radio signal (e.g., represented by propagating radio waves) may vary significantly across the length of the filter. Alternatively or in addition, the phase velocity (c) of the radio signal may vary insignificantly across the respective filter range.

13. The method (200) of any one of embodiments 1 to 12, wherein the length (508) of the filter (206) in the frequency domain is an increasing function of a coherence bandwidth, B, of the radio channel (330), and/or wherein the length (508) of the filter in the frequency domain is a decreasing function of a root-mean-squared delay spread, D, of the radio channel (330), and/or wherein the length (508) of the filter in the frequency domain is a decreasing function of a subcarrier spacing, SCS, of the subcarriers (406) of the radio channel (330).

14. The method (200) of any one of embodiments 1 to 13, further comprising or initiating the step of:
  receiving (208) at least one of data and control information from the transmitter at the receiver (100) on the radio channel (330) using each of or at least one of the filtered channel estimates (506) in the respective frequency ranges (502).

15. The method (200) of any one of embodiments 1 to 14, further comprising or initiating the step of:
  transmitting (210) at least one of data and control information from the receiver (100) to the receiver on the radio channel (330) using time-division duplexing and each of or at least one of the filtered channel estimates (506) in the respective frequency ranges (502).

The filtered channel estimates may be used for the transmission based on channel reciprocity of the radio channel.

16. The method (200) of embodiment 14 or 15, wherein the filter (206) uses weights associated to the frequency ranges (502), and wherein a weight associated to one of the frequency ranges (502) that comprises one or more subcarriers (406) used for the reception (208) or the transmission (210) is greater than one or more weights associated to one or more frequency ranges (502) that are unused for the reception (208) or the transmission (210).

17. The method (200) of any one of embodiments 14 to 16, wherein the filter (206) uses weights associated to the frequency ranges (502), and wherein the weights are a decreasing function of the distance in the frequency domain between the associated frequency ranges (502) and a subcarrier (406) used for the reception (208) or the transmission (210).

The weights may be a (e.g., monotonically) decreasing function of the distance in the frequency domain between a subcarrier used by the reception and the respective frequency ranges to which the weight is associated (briefly referred to as associated frequency ranges). Alternatively or in addition, a shape of the filtering in the frequency domain may be centered relative to a subcarrier used by the reception.

18. The method (200) of any one of embodiments 14 to 17, wherein the filter is a symmetric triangular filter (206) in the frequency domain.

19. The method (200) of any one of embodiments 14 to 18, wherein the length (508) of the filter (206) is L and the weight of the filter (206) for the frequency range (502) at a distance k in terms of the frequency ranges (502) from the frequency range (502) that is used for the reception (208) or the transmission (210) corresponds to $$f(k) = \frac{1}{L + \left\lfloor \frac{L}{2} \right\rfloor^2} \left( \left\lceil \frac{L}{2} \right\rceil - |k| \right), k = -\left\lfloor \frac{L}{2} \right\rfloor, \ldots, \left\lfloor \frac{L}{2} \right\rfloor,$$

wherein $\lceil \cdot \rceil$ is the ceil operator, $\lfloor \cdot \rfloor$ is the floor operator and $|\cdot|$ is the absolute value operator.

The size of the signal sequences may correspond to the number of samples representing the respective signal sequence in the time domain and/or the number of Fourier components representing the respective signal sequence in the frequency domain.

Alternatively or in addition, the signal sequences in the set of the signal sequences may have the same size.

20. The method (200) of any one of embodiments 1 to 19, wherein a size of the signal sequences (510) is equal to the number signal sequences (510) in the set.

The size of the signal sequences in the set may be 12. Alternatively or in addition, the set may comprise 12 signal sequences. For example, the set may comprise 12 different cyclic shifts of the base sequence.

21. The method (200) of any one of embodiments 1 to 20, wherein the signal sequence (510) comprised in the radio signal in the respective frequency range (502) is mapped to the subcarriers (406) in the respective frequency range (502).

22. The method (200) of any one of embodiments 1 to 21, wherein, in each of the determined (202) frequency ranges (502), the signal sequence (510) comprised in the radio signal or each signal sequence (510) in the set of signal sequences (510) is mapped to all subcarriers (406) or consecutive subcarriers (406) within the respective frequency range (502).

23. The method (200) of any one of embodiments 1 to 22, wherein, in each of the determined (202) frequency ranges (502), a power spectrum of the signal sequence (510) comprised in the radio signal or each signal sequence (510) in the set of signal sequences (510) is non-zero or constant across the respective frequency range (502).

24. The method (200) of any one of embodiments 1 to 21, wherein, in each of the determined (202) frequency ranges (502), the signal sequence (510) comprised in the radio signal or each signal sequence (510) in the set of signal sequences (510) is mapped to a nonconsecutive subset of the subcarriers (406) in the respective frequency range (502).

25. The method (200) of embodiment 24, wherein the initial channel estimate (504) is based on only the nonconsecutive subset of subcarriers (406) in the respective frequency range (502).

26. The method (200) of embodiment 24 or 25, wherein performing the initial channel estimation (204) comprises:
computing a subcarrier initial channel estimate for each subcarrier (406) in the nonconsecutive subset of subcarriers (406) within each of the frequency ranges (502); and
averaging the subcarrier initial channel estimates within each of the frequency ranges (502), resulting in the initial channel estimate (504) for each of the frequency ranges (502).

27. The method (200) of any one of embodiments 1 to 26, wherein the frequency ranges (502) are determined (202) by the range of subcarriers (406) to which the signal sequence (510) is mapped.

28. The method (200) of any one of embodiments 1 to 27, wherein each of the frequency ranges (502) corresponds to a different physical resource block, PRB, of the RAN (300).

29. The method (200) of any one of embodiments 1 to 28, wherein each of the frequency ranges (502) correspond to two or more consecutive PRBs of the RAN (300).

30. The method (200) of any one of embodiments 1 to 29, wherein each of the frequency ranges (502) correspond to a different portion of a PRB of the RAN (300).

31. The method (200) of any one of embodiments 1 to 30, wherein the frequency ranges (502) are at least one of disjoint, non-overlapping and contiguous in the frequency domain.

32. The method (200) of any one of embodiments 1 to 31, wherein the transmitter is a radio device configured for radio access to the RAN (300), and/or wherein the receiver (100) is a network node configured to provide radio access in the RAN (300), and/or wherein the radio channel (330) comprises a physical uplink control channel, PUCCH, of the RAN (300).

33. The method (200) of any one of embodiments 1 to 32, wherein the transmitter is a network node configured to provide radio access in the RAN (300), and/or wherein the receiver (100) is a radio device configured for radio access to the RAN (300), and/or the radio channel (330) comprises a physical downlink control channel, PDCCH, of the RAN (300).

34. A computer program product comprising program code portions for performing the steps of any one of the embodiments 1 to 33 when the computer program product is executed on one or more computing devices (704; 804), optionally stored on a computer-readable recording medium (706; 806).

35. A radio device (100; 320; 800; 991; 992; 1030) for performing channel estimation for a radio channel (330) between a transmitter and a receiver (100; 320; 800; 991; 992; 1030) of a radio access network, RAN (300), the radio device (100; 320; 800; 991; 992; 1030) comprising memory operable to store instructions and processing circuitry operable to execute the instructions, such that the radio device (100; 320; 800; 991; 992; 1030) is operable to:
determine, in a frequency domain of the radio channel (330), frequency ranges (502) over which signal sequences (510) out of a set of signal sequences (510) are orthogonal;
perform an initial channel estimation (204) of the radio channel (330) for each of the frequency ranges (502) based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and
apply a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

36. The radio device (100; 320; 800; 991; 992; 1030) of embodiment 35, further operable to perform the steps of any one of embodiments 2 to 33.

37. A radio device (100; 320; 800; 991; 992; 1030) for performing channel estimation for a radio channel (330) between a transmitter and a receiver (100; 320; 800; 991; 992; 1030) of a radio access network, RAN (300), the radio device (100; 320; 800; 991; 992; 1030) being configured to:
determine, in a frequency domain of the radio channel (330), frequency ranges (502) over which signal sequences (510) out of a set of signal sequences (510) are orthogonal;
perform an initial channel estimation (204) of the radio channel (330) for each of the frequency ranges (502) based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and
apply a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

38. The radio device (100; 320; 800; 991; 992; 1030) of embodiment 37, further configured to perform the steps of any one of embodiments 2 to 33.

39. A user equipment, UE, (100; 320; 800; 991; 992; 1030) configured to communicate with a network node (100; 310; 700; 912; 1020) or with a radio device functioning as a gateway, the UE (100; 320; 800; 991; 992; 1030) comprising a radio interface (1102; 1437) and processing circuitry (804; 1038) configured to:
determine, in a frequency domain of the radio channel (330), frequency ranges (502) over which signal sequences (510) out of a set of signal sequences (510) are orthogonal;
perform an initial channel estimation (204) of the radio channel (330) for each of the frequency ranges (502)

based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and apply a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

40. The UE (100; 320; 800; 991; 992; 1030) of embodiment 39, wherein the processing circuitry (804; 1038) is further configured to execute the steps of any one of embodiments 2 to 33.

41. A network node (100; 310; 700; 912; 1020) for performing channel estimation for a radio channel (330) between a transmitter and a receiver (100; 310; 700; 912; 1020) of a radio access network, RAN (300), the network node (100; 310; 700; 912; 1020) comprising memory operable to store instructions and processing circuitry operable to execute the instructions, such that the network node (100; 310; 700; 912; 1020) is operable to:

determine, in a frequency domain of the radio channel (330), frequency ranges (502) over which signal sequences (510) out of a set of signal sequences (510) are orthogonal;

perform an initial channel estimation (204) of the radio channel (330) for each of the frequency ranges (502) based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and apply a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

42. The network node (100; 310; 700; 912; 1020) of embodiment 41, further operable to perform any one of the steps of any one of embodiments 2 to 33.

43. A network node (100; 310; 700; 912; 1020) for performing channel estimation for a radio channel (330) between a transmitter and a receiver (100; 310; 700; 912; 1020) of a radio access network, RAN (300), the network node (100; 310; 700; 912; 1020) being configured to determine, in a frequency domain of the radio channel (330), frequency ranges (502) over which signal sequences (510) out of a set of signal sequences (510) are orthogonal;

perform an initial channel estimation (204) of the radio channel (330) for each of the frequency ranges (502) based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and apply a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

44. The network node (200) of embodiment 43, further configured to perform the steps of any one of embodiments 2 to 33.

45. A network node (100; 310; 700; 912; 1020) for performing channel estimation for a radio channel (330) between a transmitter and a receiver (100; 310; 700; 912; 1020) of a radio access network, RAN (300), the network node (100; 310; 700; 912; 1020) being configured to communicate with a user equipment, UE, the network node (100; 310; 700; 912; 1020) comprising a radio interface (1202; 1427) and processing circuitry (704; 1028) configured to:

determine, in a frequency domain of the radio channel (330), frequency ranges (502) over which signal sequences (510) out of a set of signal sequences (510) are orthogonal;

perform an initial channel estimation (204) of the radio channel (330) for each of the frequency ranges (502) based on a radio signal received on the radio channel (330) from the transmitter, the radio signal comprising a signal sequence (510) out of the set of signal sequences (510) in each of the frequency ranges (502), wherein a result of the initial channel estimation (204) comprises, for each of the frequency ranges (502), an initial channel estimate (504) for the respective one of the frequency ranges (502); and apply a filter (206) on the initial channel estimates (504) for the frequency ranges (502), a length (508) of the filter (206) in the frequency domain being greater than lengths of the frequency ranges (502), wherein a result of the filter (206) comprises, for each of the frequency ranges (502), a filtered channel estimate (506) for all subcarriers (406) in the respective one of the frequency ranges (502).

46. The network node (100; 310; 700; 912; 1020) of embodiment 45, wherein the processing circuitry (704; 1028) is further configured to execute the steps of any one of embodiments 2 to 33.

47. A communication system (300; 900; 1000) including a host computer (930; 1010) comprising:

processing circuitry (1018) configured to provide user data; and a communication interface (1016) configured to forward user data to a cellular or ad hoc radio network (910) for transmission to a user equipment, UE, (100; 320; 800; 991; 992; 1030) wherein the UE (100; 320; 800; 991; 992; 1030) comprises a radio interface (802; 1037) and processing circuitry (804; 1038), the processing circuitry (804; 1038) of the UE (100; 320; 800; 991; 992; 1030) being configured to execute the steps of any one of embodiments 1 to 33.

48. The communication system (300; 900; 1000) of embodiment 47, further including the UE (100; 320; 800; 991; 992; 1030).

49. The communication system (300; 900; 1000) of embodiment 47 or 48, wherein the radio network (300; 910) further comprises a base station (100; 310; 700; 912; 1020), or a radio device (100; 320; 800; 991; 992; 1030) functioning as a gateway, which is configured to communicate with the UE (100; 320; 800; 991; 992; 1030).

50. The communication system (300; 900; 1000) of embodiment 49, wherein the base station (100; 310; 700; 912; 1020), or the radio device (100; 320; 800; 991; 992; 1030) functioning as a gateway, comprises processing circuitry (704; 1028), which is configured to execute the steps of embodiment 1 to 33.

51. The communication system (300; 900; 1000) of any one of embodiments 47 to 50, wherein:
the processing circuitry (1018) of the host computer (930; 1010) is configured to execute a host application (1012), thereby providing the user data; and
the processing circuitry (804; 1038) of the UE (100; 320; 800; 991; 992; 1030) is configured to execute a client application (1032) associated with the host application (1012).

What is claimed is:

1. A method of performing channel estimation for a radio channel between a transmitter and a receiver of a radio access network (RAN), the method performed by the receiver and comprising or initiating the steps of:
performing an initial channel estimation of the radio channel for each of a plurality of frequency ranges, based on a radio signal received on the radio channel from the transmitter, the radio signal comprising a signal sequence out of a set of signal sequences in each of the frequency ranges, wherein a result of the initial channel estimation comprises, for each of the frequency ranges, an initial channel estimate for the respective one of the frequency ranges, and wherein the frequency ranges are ranges over which signal sequences out of the set of signal sequences are orthogonal; and
applying a filter to the initial channel estimates for the frequency ranges, a length of the filter with respect to frequency being greater than lengths of the frequency ranges, wherein a result of the filter comprises, for each of the frequency ranges, a filtered channel estimate for all subcarriers in the respective one of the frequency ranges.

2. The method of claim 1, wherein the method comprises the step of determining the frequency ranges of the radio channel over which the signal sequences are orthogonal.

3. The method of claim 1, wherein performing the initial channel estimation comprises:
computing a subcarrier initial channel estimate for each subcarrier within each of the frequency ranges; and
averaging the subcarrier initial channel estimates within each of the frequency ranges, resulting in the initial channel estimate for each of the frequency ranges.

4. The method of claim 1, wherein the length of the filter is an integer multiple of a common length of the frequency ranges, and/or wherein the length of the filter encompasses a contiguous subset of the frequency ranges.

5. The method of claim 1, wherein the lengths of the frequency ranges are such as to at least comprise a range of subcarriers to which the signal sequence out of the set of signal sequences is mapped.

6. The method of claim 1, wherein the set of signal sequences comprises cyclic shifts of a base sequence or a demodulation reference signal (DM-RS).

7. The method of claim 6, wherein the base sequence comprises a Zadoff-Chu sequence.

8. The method of claim 1, wherein the signal sequences are orthogonal, if a cross-correlation between samples of the signal sequences is zero or essentially zero.

9. The method of claim 8, wherein a sampling rate of the samples of the signal sequences is, or is proportional to, an inverse of one of the lengths of the frequency ranges.

10. The method of claim 1, wherein the method comprises calculating the length of the filter based on a ratio between a filter span over which the filter is applied and a number of resources in a length of the frequency ranges.

11. The method of claim 10, wherein the filter span and the length of the frequency ranges in the ratio are determined in numbers of resource elements (REs).

12. The method of claim 10, wherein the length of the filter is an odd value closest to the ratio.

13. The method of claim 1, wherein the method comprises calculating the length of the filter depending on a variation of the initial channel estimates with respect to frequency or a dispersion of the radio channel.

14. The method of claim 1, wherein each of the frequency ranges corresponds to a different physical resource block (PRB) of the RAN.

15. The method of claim 1, wherein each of the frequency ranges corresponds to two or more consecutive physical resource blocks (PRBs) of the RAN.

16. The method of claim 1, wherein each of the frequency ranges corresponds to a different portion of a physical resource block (PRB) of the RAN.

17. The method of claim 1, wherein the transmitter is a radio device configured for radio access to the RAN, and/or wherein the receiver is a network node configured to provide radio access in the RAN, and/or wherein the radio channel comprises a physical uplink control channel (PUCCH) of the RAN.

18. The method of claim 1, wherein the transmitter is a network node configured to provide radio access in the RAN, and/or wherein the receiver is a radio device configured for radio access to the RAN, and/or the radio channel comprises a physical downlink control channel (PDCCH) of the RAN.

19. A radio device for performing channel estimation for a radio channel between a transmitter and a receiver of a radio access network (RAN), the radio device comprising memory operable to store instructions and processing circuitry operable to execute the instructions, such that the radio device is operable to:
perform an initial channel estimation of the radio channel for each of a plurality of frequency ranges, based on a radio signal received on the radio channel from the transmitter, the radio signal comprising a signal sequence out of a set of signal sequences in each of the frequency ranges, wherein a result of the initial channel estimation comprises, for each of the frequency ranges, an initial channel estimate for the respective one of the frequency ranges, and wherein the frequency ranges are ranges over which signal sequences out of the set of signal sequences are orthogonal; and
apply a filter to the initial channel estimates for the frequency ranges, a length of the filter with respect to frequency being greater than lengths of the frequency ranges, wherein a result of the filter comprises, for each of the frequency ranges, a filtered channel estimate for all subcarriers in the respective one of the frequency ranges.

20. A network node for performing channel estimation for a radio channel between a transmitter and a receiver of a radio access network (RAN), the network node being configured to:

perform an initial channel estimation of the radio channel for each of a plurality of frequency ranges, based on a radio signal received on the radio channel from the transmitter, the radio signal comprising a signal sequence out of a set of signal sequences in each of the frequency ranges, wherein a result of the initial channel estimation comprises, for each of the frequency ranges, an initial channel estimate for the respective one of the frequency ranges, and wherein the frequency ranges are ranges over which signal sequences out of the set of signal sequences are orthogonal; and apply a filter to the initial channel estimates for the frequency ranges, a length of the filter with respect to frequency being greater than lengths of the frequency ranges, wherein a result of the filter comprises, for each of the frequency ranges, a filtered channel estimate for all subcarriers in the respective one of the frequency ranges.

\* \* \* \* \*